US012676847B2

(12) United States Patent
Piagentini et al.

(10) Patent No.: US 12,676,847 B2
(45) Date of Patent: Jul. 7, 2026

(54) DECLARATIVE AUTHENTICATION ENGINE

(71) Applicant: Salesforce, Inc., San Francisco, CA (US)

(72) Inventors: Federico Piagentini, Buenos Aires (AR); Franco Garcia, Buenos Aires (AR)

(73) Assignee: Salesforce, Inc., San Francisco, CA (US)

( * ) Notice: Subject to any disclaimer, the term of this patent is extended or adjusted under 35 U.S.C. 154(b) by 79 days.

(21) Appl. No.: 18/422,224

(22) Filed: Jan. 25, 2024

(65) Prior Publication Data

US 2025/0247383 A1     Jul. 31, 2025

(51) Int. Cl.
H04L 9/40 (2022.01)

(52) U.S. Cl.
CPC ................................. H04L 63/083 (2013.01)

(58) Field of Classification Search
CPC .................................................... H04L 63/083
See application file for complete search history.

(56) References Cited

U.S. PATENT DOCUMENTS

| | | | | |
|---|---|---|---|---|
| 8,499,339 | B2 * | 7/2013 | Chao ..................... | H04L 9/3213 |
| | | | | 705/77 |
| 2013/0159711 | A1 * | 6/2013 | Kaal ................... | H04L 65/1069 |
| | | | | 713/168 |
| 2016/0077897 | A1 * | 3/2016 | Tsang ..................... | G06F 9/541 |
| | | | | 719/328 |
| 2018/0329782 | A1 * | 11/2018 | Kludy ................. | G06F 11/3006 |
| 2020/0136893 | A1 * | 4/2020 | Schroeder ........... | H04L 63/0815 |
| 2024/0121609 | A1 * | 4/2024 | Neipris ............... | H04W 12/043 |

* cited by examiner

*Primary Examiner* — Sm A Rahman
(74) *Attorney, Agent, or Firm* — Sterne, Kessler, Goldstein & Fox P.L.L.C.

(57) ABSTRACT

Disclosed herein are system, method, and computer program product embodiments for implementing variable a declarative authentication engine. The system generates a schema that includes a field and has a format defined by an authentication protocol associated with a service. The system then validates a connection request based on comparing the field of the generated schema to a field of the connection request for the service, wherein the connection request is formatted according to the schema and received from a client device. The system then provides the client device access to the service according to the connection request based on a result of the validating.

18 Claims, 7 Drawing Sheets

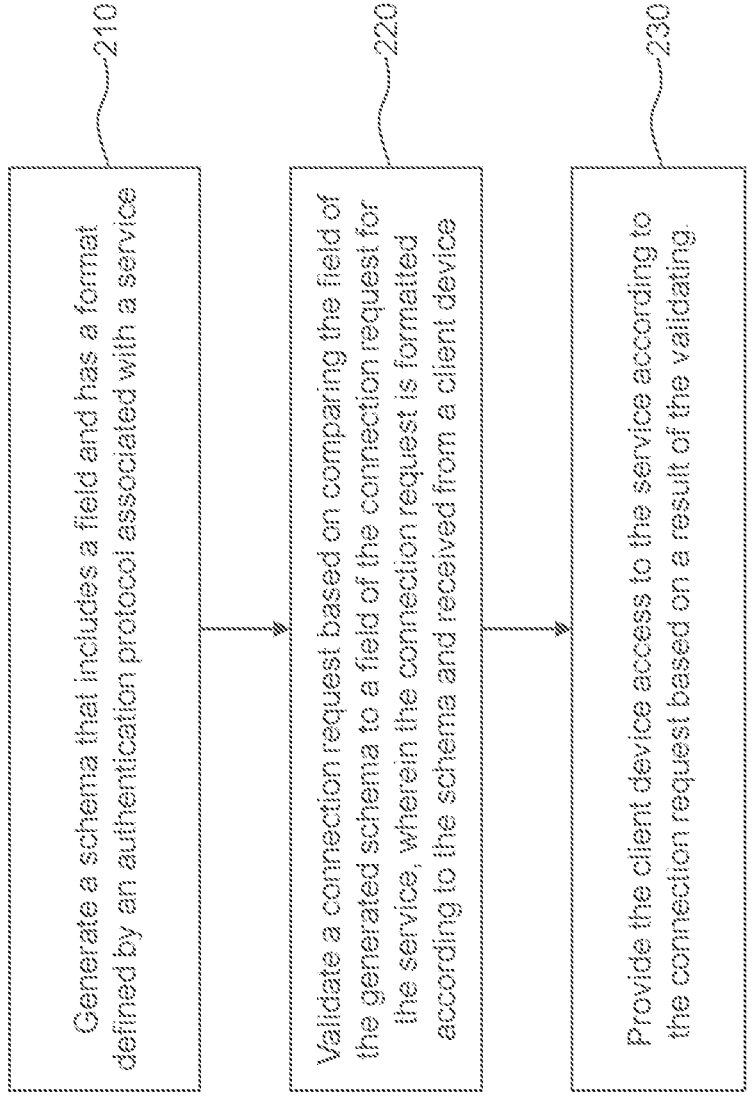

210

Generate a schema that includes a field and has a format defined by an authentication protocol associated with a service

220

Validate a connection request based on comparing the field of the generated schema to a field of the connection request for the service, wherein the connection request is formatted according to the schema and received from a client device

230

Provide the client device access to the service according to the connection request based on a result of the validating.

310 Receive connection request

320 Identify schema

330 Populate schema

340 Generate connection creation form

350 Provide access to service

400

410 — Store connection request at connection store

420 — Receive second connection request

430 — Identify stored connection

440 — Provide access to service

Service: Test Service
ServiceURL: https://testservice.com
Version: 1.0
BaseProtocol:
Field:
Username:
Hidden: False
Password:
Hidden: True

DECLARATIVE AUTHENTICATION ENGINE

BACKGROUND

One or more implementations relate to the field of schema generation and validation, and more specifically to a modified and improved declarative authentication engine.

Enterprise systems often execute services that are accessible through application programing interfaces (API). These APIs are often manually coded and may not be transferable between services. Additionally, it may be difficult to extend these API's to tailor them for service-specific uses.

BRIEF DESCRIPTION OF THE DRAWINGS

The accompanying drawings are incorporated herein and form a part of the specification.

FIG. 2 illustrates a flowchart diagram of an exemplary method for using a declarative authentication engine, according to embodiments of the present disclosure.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for a declarative authentication engine.

Networked services may utilize API's to define communication protocols. For example, an API may specify a URL to interact with the service (e.g., HTTP POST, HTTP GET). Services also frequently rely on base protocols to perform tasks. One task services may use a base protocol for is authentication. Authentication allows a service to confirm the identity of an entity it's communicating with. For example, a service may use OAuth 2.0 to provide authentication mechanisms. Services may also rely on base protocols to provide encryption for the communication session. However, service providers may wish to add custom fields to these base protocols in order to provide additional functionality to a service. An authentication engine, as described below, may be used to receive an API description, interpret it, and generate a schema that will allow connectivity with the service. For example, the schema may include details on how to connect to the service. In this example, the schema may include a URL of the service, along with username and password used to authenticate a connection to the service. The authentication engine may further allow customized fields or extensions to be included within the API.

Using an authentication engine to generate a schema for connecting to a service, as opposed to manually creating it, increases computer security by reducing the risk that a developer will create mistakes. For example, if a developer is manually defining the API that will be used for authentication or encryption, there is a risk that a mistake will prevent these utilities from operating properly. Therefore, by generating the schema improves security by removing any risk associated with manually creating the API.

Utilizing an authentication engine to generate schemas increases interoperability between systems because schemas can easily be updated work with different services. For example, two services may require similar API functionality, such as authentication and encryption. In this example, the authentication engine can be used to copy the schema associated with the first service, and update it to correspond to the second service.

Figure 1:
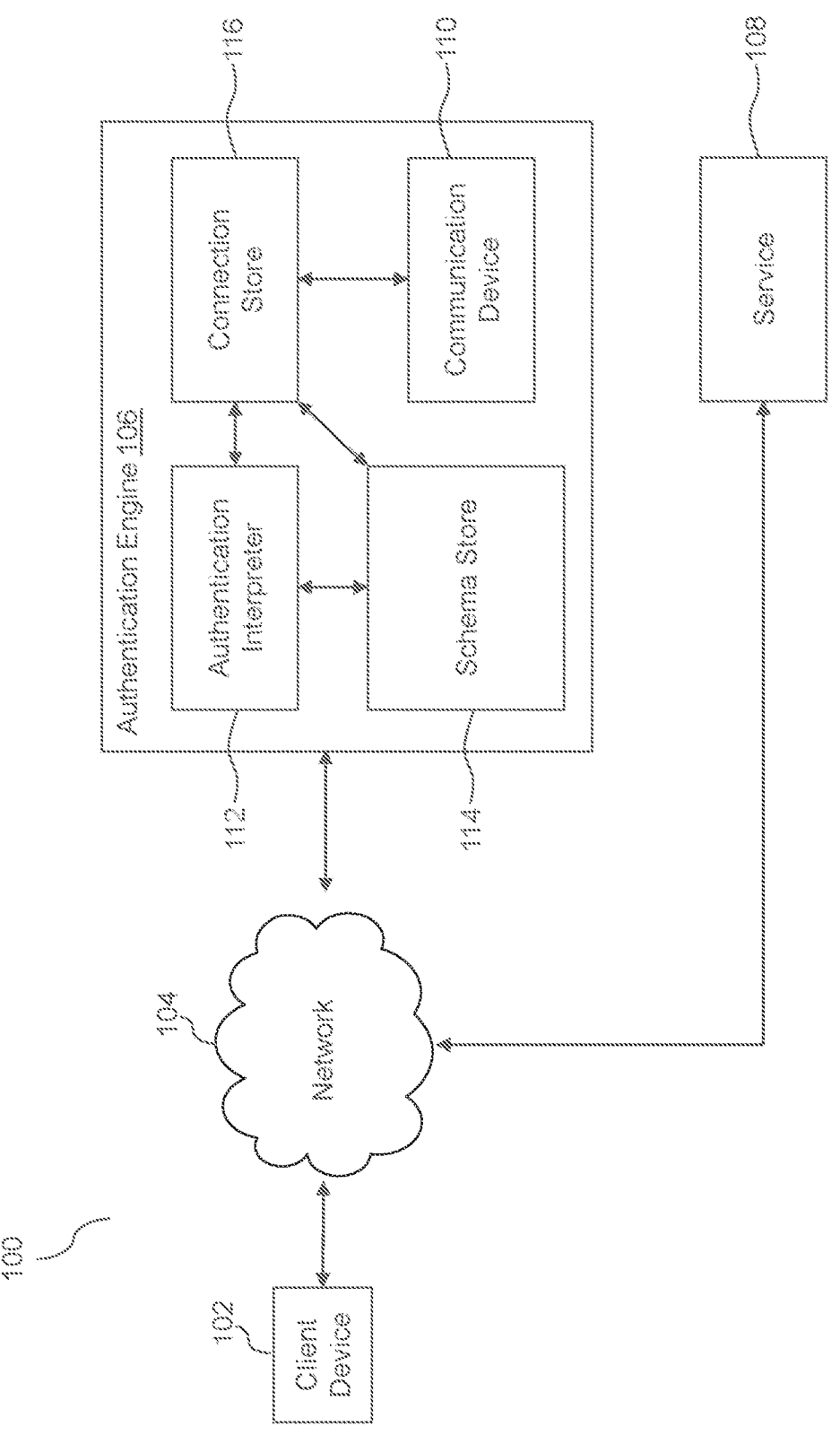
FIG. 1 illustrates an exemplary authentication environment, according to embodiments of the present disclosure.

FIG. 1 illustrates an exemplary authentication environment 100, according to embodiments of the present disclosure. Authentication environment 100 may include client device 102, network 104, authentication engine 106, and service 108. Client device 102 may be any entity in communication with authentication engine 106. Client device 102 may be a computer system such as computer system 700 described with reference to FIG. 7. Client device 102 may be a client system such as a desktop workstation, laptop or notebook computer, netbook, tablet, smart phone, and/or other computing device that may be using an enterprise computing system. Client device 102 may have an account associated with it. For example, client device 102 may have an administrator account associated with creating and managing schemas. Client device 102 may be configured to have a user account associated with accessing service 108.

Network 104 may be any type of computer or telecommunications network capable of communicating data, for example, a local area network, a wide-area network (e.g., the Internet), or any combination thereof. The network may include wired and/or wireless segments. In some embodiments, network 104 may be a secure network. In some embodiments, client device 102 may reside within network 104. In some embodiments, client device 102 may reside outside network 104.

Authentication engine 106 may be implemented using one or more servers and/or databases. In some embodiments, authentication engine 106 may be implemented using a computing device such as a desktop workstation, laptop or notebook computer, netbook, tablet, smart phone, and/or other computing device. In some embodiments, authentication engine 106 may be implemented as an application in an enterprise computing system and/or a cloud-computing system. In some embodiments, authentication engine 106 may be a computer system such as computer system 700 described with reference to FIG. 7.

Authentication engine 106 may include communication device 110, authentication interpreter 112, schema store 114, and connection store 116. Communication device 110 may be configured to communicate with client device 102 and service 108, via network 104. Communication device 110 may comprise any suitable network interface capable of transmitting and receiving data, such as, for example a modem, an Ethernet card, a communications port, or the like. Communication device 110 may be able to transmit data using any wireless transmission standard such as, for example, Wi-Fi, Bluetooth, cellular, or any other suitable wireless transmission.

Authentication interpreter 112 may receive a description of a connection to a service, such as service 108, and generate a schema corresponding to the description. Authentication engine 106 may generate a graphical user interface (GUI) used to describe the connection for interpretation by authentication interpreter 112. In embodiments, the GUI may be an integrated development environment. Client device 102 may connect to authentication engine 106 to view and interact with the GUI. Client device 102 may be able to interact with the GUI via its administrator account.

The description may include one or more fields that will be used to create the schema and connect to the service. A field may include a key and a value. In embodiments, a field may include a type corresponding to the format of the field (e.g., string, integer, etc.) The GUI may include an ability to select a base protocol (e.g., OAuth 2.0). Once a base protocol is selected, the GUI may update to display each field required by the base protocol. Automatically displaying the required fields associated with the base protocol may reduce the risk associated with manually coding the API, thereby improving computer and network security.

Each field in the schema may correspond to information about the service and/or entity, such as client device 102, attempting to access the service. For example, a field may be a URL designating the address of a resource (e.g., service 108) on a network. In embodiments, fields may also include a username and password used to authenticate a device such as client device 102. Fields may also include information about the structure of information communicated with a service. For example, a message for a service may include a header and a body. Here, a field may include a designation for whether the value should be included in the header or body of the message.

Fields in the schema may have different types. For example, some fields may be represented as text, while other fields may be represented as numbers, or a combination of both. Fields within the schema may also be defined as scripts that execute when an instance of the schema is generated. The value produced by the script may be used in the generated schema. For example, a service may use encryption to protect connections and communications. As part of the encryption, the service may require a nonce or random number to encrypt the session. In this example, the field within the schema for the nonce or random number may be a script that generates the value. Once a client, such as client device 102, attempts to connect to the service and provides the fields required by the schema, the script may be executed generating the additional required field. Allowing stored schemas to include scripts as field values allows services to take advantage of additional functionality, reduces the burden associated with manually creating certain values, and increases interoperability by allowing schemas to be reused.

Authentication interpreter 112 may be further configured to validate schemas that are generated. For example, if a schema references a base protocol or API, such as OAuth 2.0, authentication interpreter 112 may confirm that fields required by the base protocol are included in the schema. If required fields are missing, authentication interpreter 112 may be configured to generate a default schema. In embodiments, the default schema may include a username and password. The default schema may be updated by authentication engine 106. In embodiments, if authentication interpreter 112 determines that required fields are missing or an error is present, authentication engine 106 may notify client device 102. For example, authentication engine 106 may generate and send a notification (e.g., instant message, email, SMS, phone call, etc.) to client device 102 via communication device 110. The notification may be an alert that the schema cannot be validated. The notification may include a link that when interacted with, causes the GUI to be displayed. The GUI may include the part of the schema that failed validation. Authentication engine 106 may be further configured to send a notification when the schema is successfully validated.

Authentication interpreter 112 may be configured to extend the schema. For example, a schema may reference a base protocol, such as OAuth 2.0. In addition to the fields required by the base protocol, authentication interpreter 112 may allow additional fields to be added. For example, a service, such as service 108 may have a logo associated with it. A field linking to a location of the logo may be added to the schema so that when a form is generated for a client device to provide the required fields, the logo may be displayed. Authentication interpreter 112 may include a store of custom fields added. The GUI generated by authentication interpreter 112 may display the store of custom fields. This may allow client device 102 to see custom fields previously used, and decide if they should be added to the service corresponding to the schema. Presenting this information via the GUI to client device 102 may increase efficiency because the schema can be created with all the information required, and reduces the need to go back and update the schema in the future. The generated schema may be formatted as a JSON file.

Schema store 114 may be a memory device used to store generated schemas. Schema store 114 may be organized using a variety of methods. For example, schemas may be organized by the service they correspond to. Schema store 114 may be referenced when client device 102 attempts to connect to service 108. For example, when client device 102 attempts to connect to service 108, authentication engine 106 may identify a schema at schema store 114 corresponding to service 108. The schema may be used to create a GUI, including fields required by the schema, that client device 102 interacts with to provide required information. For example, service 108 may have a corresponding schema requiring a username and password. In this example, when service 108 is accessed by client device 102, service 108 may display a GUI including fields for username and password according to the schema.

Schemas at schema store 114 may be updated. For example, if a service updates its connection or authentication mechanisms, the corresponding schema may also be updated. For example, a service may update its authentication mechanism to utilize two-factor authentication. In this example, the schema corresponding to the service may be updated to require a source for the two-factor authentication such as an email address or phone number. In embodiments, client device 102 may be configured to update the schema. For example, client device 102 may access authentication engine 106 and view schemas it has permissions to view. In embodiments, client device 102 may use the GUI created by authentication engine 106 to change the schema.

Connection store 116 may store instantiations of generated schemas. The instantiated generated schemas may be formatted according to the schema associated with the corresponding service. An instantiation of a schema may be generated when a device attempts to access a service and provides information required by the schema in order to use the service. Connection store 116 may be organized using a variety of methods. For example, generated schemas may be stored under the service that they correspond to. For example, once a client device, such as client device 102, submits the information required by the schema corresponding to service 108, an instance of the schema may be created and stored at connection store 116. The instance may be stored under an identifier associated with client device 102. In embodiments, the instance may be stored under an identifier associated with service 108.

For example, the schema associated with service 108 may require a username and password. Once client device 102 submits this information, an instance of the schema including client device 102's username and password may be created and stored at connection store 116. Connection store 116 may be referenced when client device 102 attempts to access service 108. For example, if client device 102 has already submitted information required by the schema associated with service 108, client device 102 can input the same information and it may be compared to instantiated schemas (e.g., stored connection requests) the at connection store 116, to confirm that client device 102 has in fact already authenticated with service 108.

Connection store 116 may require various degrees of similarity in order for a current connection request to be matched to a stored connection request. For example, connection store 116 may require that usernames and passwords exactly match. In embodiments, if a certain amount of time has passed between the stored connection request and the current connection request, authentication engine 106 may require client device 102 to create an updated instantiation of the schema. In embodiments, the schema may include a field for client device 102's IP address. If the IP address of the stored connection request differs from the current connection request IP address, authentication engine 106 may require client device 102 to create an updated instantiation of the schema.

Connection store 116 may have a threshold time after which instantiations of generated schemas are removed. This may be beneficial to reduce the amount of storage connection store 116 uses. In embodiments, connection store 116 may remove stored connections that have not been accessed after a certain amount of time. For example, client device 102 may be an employee laptop and service 108 may be a messaging service used by the employee laptop. If the employee associated with the laptop leaves the company, authentication engine 106 can manually remove the connection associate with the laptop. Additionally, authentication engine 106 can remove the stored connection associated with the employee laptop after a certain amount of time has passed. The time threshold may be updated at connection store 116.

Connection store 116 may be updated. In embodiments, if a schema is updated, connections at connection store 116 corresponding to the updated schema may be invalidated or removed. For example, a service may update its authentication protocol to utilize two-factor authentication. In this instance, the schema may be updated as well. In order to protect the service and device connecting to the service, any instances of the old schema at connection store 116 may be invalidated or removed. In this example, a device that connected under the old schema may be forced to provide updated information corresponding to the new schema. In embodiments, schemas may allow for backwards compatibility. For example, a schema may be updated with new fields that may be optional. In this example, connections at connection store 116 that do not reference the updated schema may still be used to connect to service 108 because the new fields are optional.

Service 108 may be any resource that client device 102 attempts to access. For example, service 108 may be an instant messaging service or an email service. Service 108 be implemented using one or more servers and/or databases. In some embodiments, service 108 may be implemented using a computing device such as a desktop workstation, laptop or notebook computer, netbook, tablet, smart phone, and/or other computing device. In some embodiments, service 108 may be implemented as an application in an enterprise computing system and/or a cloud-computing system. In some embodiments, service 108 may be a computer system such as computer system 700 described with reference to FIG. 7. Service 108 may include a GUI that allows client device 102 to access and interact with service 108.

FIG. 2 illustrates a flowchart diagram of an exemplary method 200 for using a declarative authentication engine according to embodiments of the present disclosure. As shown in FIG. 2, the method begins at step 210 by authentication engine 106 generating a schema that includes a field and has a format defined by an authentication protocol associated with a service (e.g., service 108). For example, in an embodiment, the field may be a username. In an embodiment, the authentication protocol may be OAuth 2.0. The schema may be generated by authentication engine 106. The schema may be generated by interacting with a GUI at authentication engine 106. The schema may include extended or customized fields that are specific to the service. For example, the schema may include the network location (e.g., a URL) to a logo associated with the service that may be displayed on a GUI associated with the service. The schema may include fields defined as scripts that execute when a client connects to the service.

In step 220, authentication engine 106 validates a connection request based on comparing the field of the generated schema to a field of the connection request for the service, wherein the connection request is formatted according to the schema and received from a client device 102 via network 104. Authentication engine 106 may receive the connection request directly. In embodiments, client device 102 may have first sent the connection request to service 108, and service 108 may have forwarded or re-directed the connection request to authentication engine 106 for validation. The connection request may be generated by client device 102 accessing a URL associated with service 108 or authentication engine 106.

The comparison may include authentication engine 106 comparing the field of the generated schema to a field of the connection request for the service formatted according to the schema. Authentication engine 106 may access the generated schema at schema store 114. The connection request may include fields describing the client device and/or the service. For example, the connection request may include a service name, a service URL, a username, and password. Authentication engine 106 may be configured to compare fields included in the connection request to the generated schema to determine that the required fields are present so that the device sending the connection request can access the service. For example, the schema may require a username and password. In this example, authentication engine 106 may examine the connection request to determine that a username and password are present.

The validating may include authentication engine 106 ensuring that each field, required by the generated schema, is present in the connection request. Additionally, authentication engine 106 may check that connection request field types match the types required by the generated schema. For example, the generated schema may allow a username to include text characters but not numbers. If the connection request username includes numbers, the validation fails and a notification (e.g., instant message, email, SMS, phone call, etc.) may be sent by authentication engine 106 to client device 102.

In step 230, authentication engine 106 provides client device 102 access to service 108 according to the connection request based on a result of the validating. For example, authentication engine 106 may forward or redirect client device 102's connection request to a URL associated with service 108. In embodiments, a GUI at client device 102 may update to display a GUI associated with service 108. As discussed above, if the connection request is not validated, a notification may be sent to client device 102 and client device 102 will not be permitted access to service 108.

Figure 3:
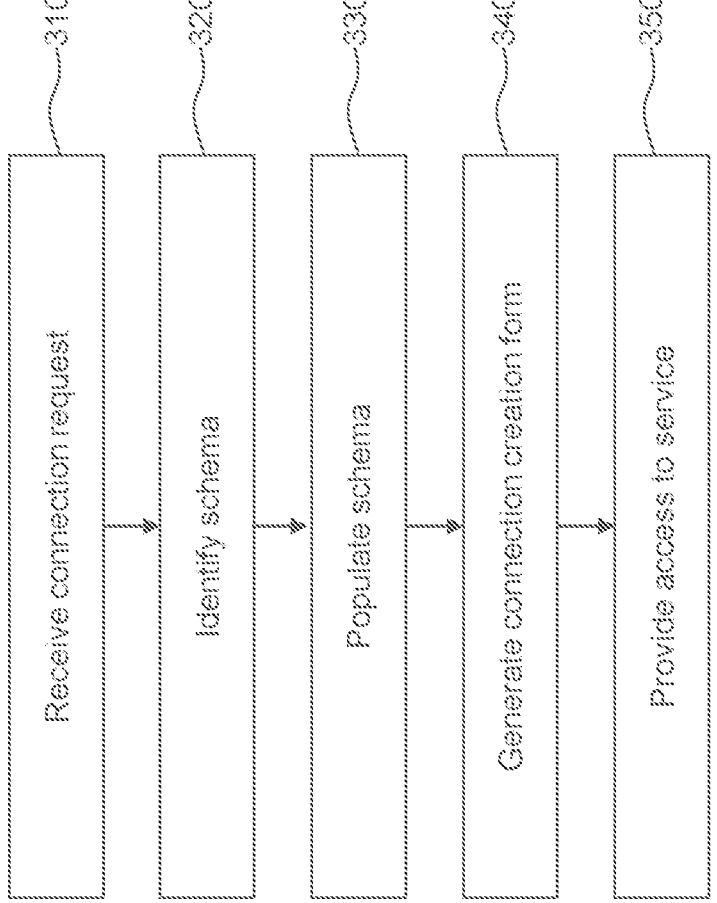
FIG. 3 illustrates a flowchart diagram of an exemplary method for using a declarative authentication engine to create a new connection request, according to embodiments of the present disclosure.

FIG. 3 illustrates a flowchart diagram of an exemplary method 300 for using a declarative authentication engine to create a new connection request, according to embodiments of the present disclosure. As shown in FIG. 3, the method begins at step 310 by receiving a connection request at authentication engine 106. The connection request may be received by authentication engine 106 before it reaches service 108. In embodiments, the connection request may be routed by network 104, directly to service 108, and service 108 may forward the connection request to authentication engine 106 in order to authenticate the connection request. The connection request may be generated by a client device, such as client device 102. The connection request may be directed at a service such as service 108, that client device 102 intends to interact with. In embodiments, the connection request may be the first time client device 102 has attempted to connect to service 108.

In step 320, authentication engine 106 identifies a schema. The schema may correspond to the service being accessed. In embodiments, the schema may be identified at schema store 116. In embodiments, a service may have more than one schema. If a service has more than one schema, authentication engine 106 may use a variety of methods to determine which schema to select. For example, the most recent schema to be created or updated may be identified. In embodiments, authentication engine 106 may identify a schema based on information in the connection request. For example, the connection request may include an identity associated with the connection request, such as whether the request is originating from a device associated with an administrator account or a user account. Authentication engine 106 may use this information to identify the correct schema. For example, service 108 may have two schemas, one for administrator accounts and one for user accounts. Different privileges may be available based on the account type used to connect to the service. Therefore, if the connection request is associated with an administrator account, the administrator account schema will be identified.

In step 330, authentication engine 106 populates the schema. For example, the schema may include a field corresponding to the name of the service. In this step, the field corresponding to the service name may be populated. The schema may include a field corresponding to the date and time of the connection request. These fields may be populated as well. The schema may include fields whose values include executable scripts. The scripts may be executed to generate the values. For example, a schema using authentication may include a script to calculate a nonce value. In this example, the script may be executed to generate the nonce value.

In step 340, authentication engine 106 generates a connection form. The connection form may be used to collect information required by the schema from client device 102. The connection form may be displayed on a GUI accessible by client device 102 via network 104. Authentication engine 106 may host and cause the GUI to be displayed. The GUI may be customized based on the schema. Fields that require input from the client device may be displayed on the GUI. For example, the schema may require a username and password. Therefore, the GUI may be customized to include fields for username and password to be input. The GUI may also be customized to show information corresponding to the service, not requiring input. For example, the GUI may include the name of the service the connection corresponds to.

The GUI may obfuscate or hide certain fields. For example, a field within the schema may have a property or attribute corresponding to whether the field should be hidden. This may be advantageous to protect privacy. For example, a schema may require a password or social security number. These fields may have properties dictating that they should be hidden. As a result, the GUI may obfuscate or hide the values input. The GUI may generate characters such as, "*", in place of the actual input characters. The GUI may be updated when fields are missing and/or formatted incorrectly. For example, if the schema requires a username and password, and these fields are not filled in on the connection form, the GUI may display a warning or indicator signaling that the data corresponding to these fields needs to be input. Additionally, schema fields may have predefined formats or types. In embodiments, some fields may only accept data formatted as text, while other fields may only accept data formatted as numbers. The connection form GUI may enforce field types by providing indicators or warnings if the data entered into the field does not match the field's type.

In step 350, authentication engine 106 provides access to the service (e.g., service 108). In embodiments, access may be provided if the required information in the schema is provided in the correct format. In embodiments, the GUI displayed on the client device (e.g., client device 102) is updated to display a GUI corresponding to the service. For example, the GUI may be accessed by navigating to a URL associated with the service. The GUI at the service may be customized according to the client device and the schema. For example, if the schema required a username, the username may be displayed in the service GUI.

Figure 4:
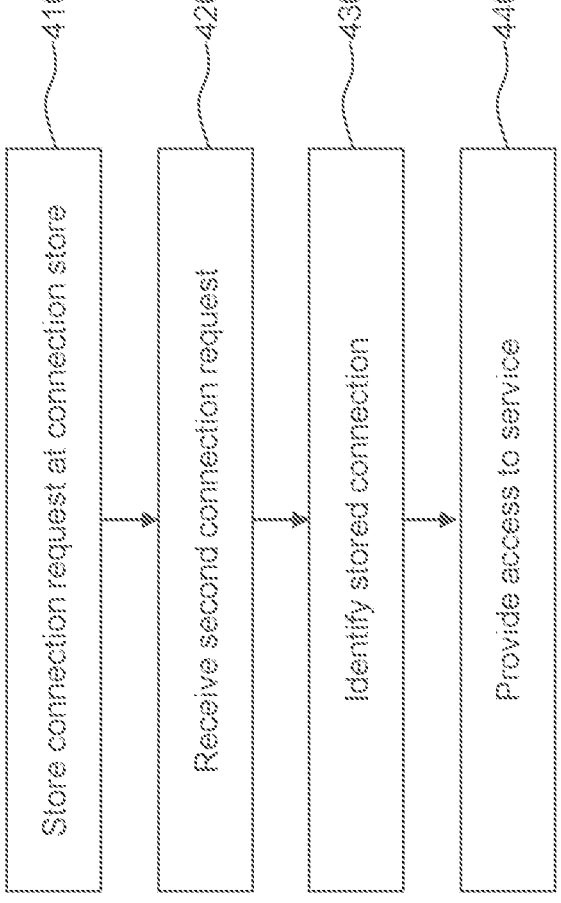
FIG. 4 illustrates a flowchart diagram of an exemplary method for utilizing stored connection requests according to embodiments, according to embodiments of the present disclosure.

FIG. 4 illustrates a flowchart diagram of an exemplary method 400 for utilizing stored connection requests, according to embodiments of the present disclosure. As shown in FIG. 4, the method begins at step 410, authentication engine 106 stores the connection request at a connection store in response to validating. In embodiments, the connection request may be stored at connection store 116. Storing the connection request allows it to be referenced in the future. For example, if a client device subsequently tries to access the service associated with the connection request, the second connection request can be compared to the stored connection request to provide access.

In step 420, authentication engine 106 receives a second connection request. The second connection request may be generated by a client device, such as client device 102. The second connection request may be directed at a service such as service 108, that the client device wishes to interact with.

In step 430, authentication engine 106 identifies a stored connection. The stored connection may be identified by searching a connection store, such as connection store 118. The stored connection may be identified in various manners. For example, authentication engine 106 may search connection store 116 based on an identifier associated with client device 102. In embodiments, the stored connection may be identified based on matching certain fields such as a username, IP address, role, network, and/or location.

In step 440, authentication engine 106 provides access to the service. As explained above, the GUI displayed on the client device is updated to display a GUI corresponding to the service. For example, the GUI may be accessed by navigating to a URL associated with the service. The GUI at the service may be customized according to the client device and the schema. For example, if the schema required a username, the username may be displayed in the service GUI.

Figure 5:
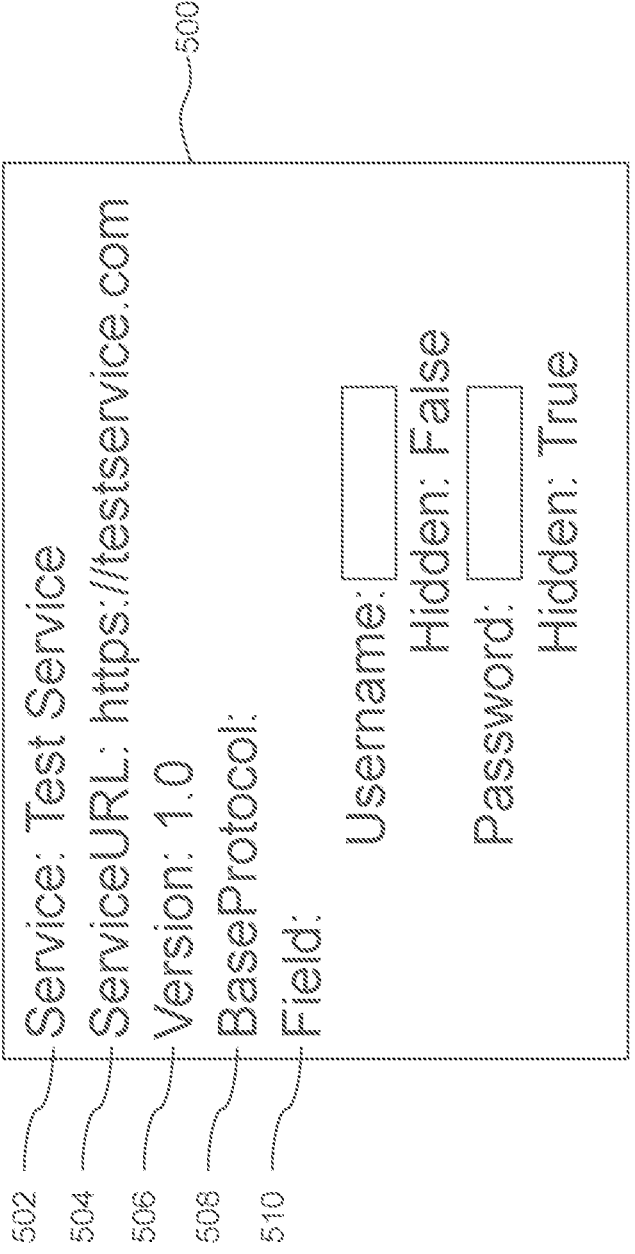
FIG. 5 depicts a view of a defined schema, according to embodiments, according to embodiments of the present disclosure.

FIG. 5 depicts a view 500 of a defined schema, according to embodiments. View 500 of the defined schema may be accessed via a GUI at authentication engine 106. The schema may include various fields. For example, the schema may include service name 502, URL 504 to access the service, version number 506, base protocol 508, and field 510. Service 502 may denote the name of the service that the defined schema corresponds to. Service URL 504 may be a URL or link to access the service on a network, such as network 104. Base protocol 508 may be an API defining how to access the service. For example, base protocol 508 may be OpenAPI 3.0. Version number 506 may be used to determine compatibility.

Field 510 may include values used by the service to provide access. Field 510 may include a key, a value, and a property. Field 510 may include multiple of each key, value, and property. For example, field 510 may include a first key corresponding to a username and a second key corresponding to a password. Each key may have a corresponding value. For example, the values of username and password may be used to associate a client device, such as client device 102, with the service (e.g., service 108). In embodiments, field 510 may be defined by reference to a script. For example, a schema used for authentication may require a random value or a nonce. In this example, a script to generate the random value or nonce can be written into the schema. When a connection request uses the schema to access the service, the script may be executed in order to populate field 510 with a value. A property may be used to characterize or customize field 510. For example, a property such as "Hidden," may be used by authentication engine 106 to determine whether input characters should be obfuscated or hidden when input.

In embodiments, schemas may be updated or changed over time. For example, a schema may initially be created with field 510 including username and password, but may be updated to include a timestamp corresponding to when a connection request is created. In this example, version number 506 may be updated based on adding the timestamp field to the schema. This allows authentication engine 106 to determine what field 510 should be included within the connection request based on the version number. For example, a connection request with version "1.0" may not include a timestamp, whereas a connection request with version "2.0" should include the timestamp. Authentication engine 106 may also determine which schema versions are compatible. For example, minor updates to a schema may not affect compatibility. However, more substantial updates such as requiring two-factor authentication to access a service may require that the connection request use the most recent schema version. In embodiments, the version may be represented as a floating point number.

Figure 6:
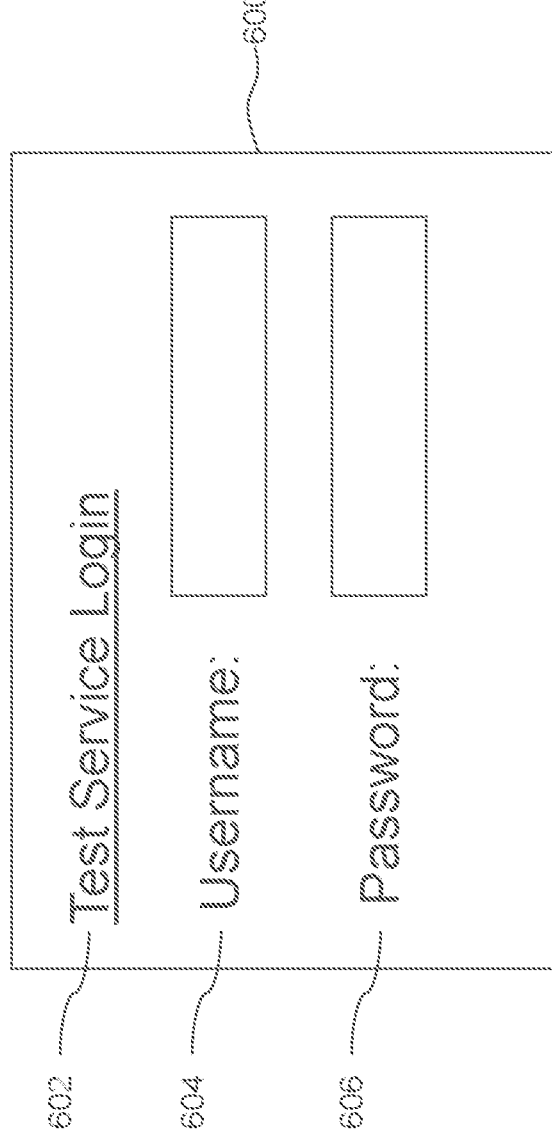
FIG. 6 depicts a view of a service accessed via a schema, according to embodiments of the present disclosure.

FIG. 6 depicts a view of GUI 600 of service 108 accessed via the schema, according to embodiments. As an example, FIG. 6 depicts the service defined in the schema in FIG. 5.

Client device 102 may access service 108 directly. For example, when a device, such as client device 102, accesses the URL corresponding to the service (e.g., service 108) as defined in FIG. 5, the service may display GUI 600 depicted in FIG. 6. In embodiments, authentication engine 106 may host GUI 600, allowing client device 102 to interact with service 108 through authentication engine 106. GUI 600 may display name 602 of the service that GUI 600 corresponds to. GUI 600 may be formatted according to the schema because the schema defines how to access the service. Therefore, since the schema field 510 included "username" and "password," GUI 600 may display username 604 and password 606.

GUI 600 may update in response to client device interactions. GUI 600 may update the fields as they are defined in the schema. For example, field 510 included username and password with corresponding "hidden" properties. Since the username hidden property is set to false, as client devices sends data to fill in the username, the input will be displayed without alteration. However, since the password hidden property is set to true, the input will be changed or obfuscated. For example, each character may be replaced with the same character such as "*". In embodiments, each character may be replaced with a random character. Once the information required by the schema for the service is input, GUI 600 may be updated. For example, GUI 600 may be updated to show a home page associated with the service.

It will be understood that the order of the above steps are merely exemplary, and the steps can be rearranged in any appropriate manner. For example, in embodiments, the envoy may perform local rate limiting prior to mapping the header and conducting a global rate limiting check. Additionally, more or fewer steps may be included in the exemplary method consistent with the disclosure.

Figure 7:
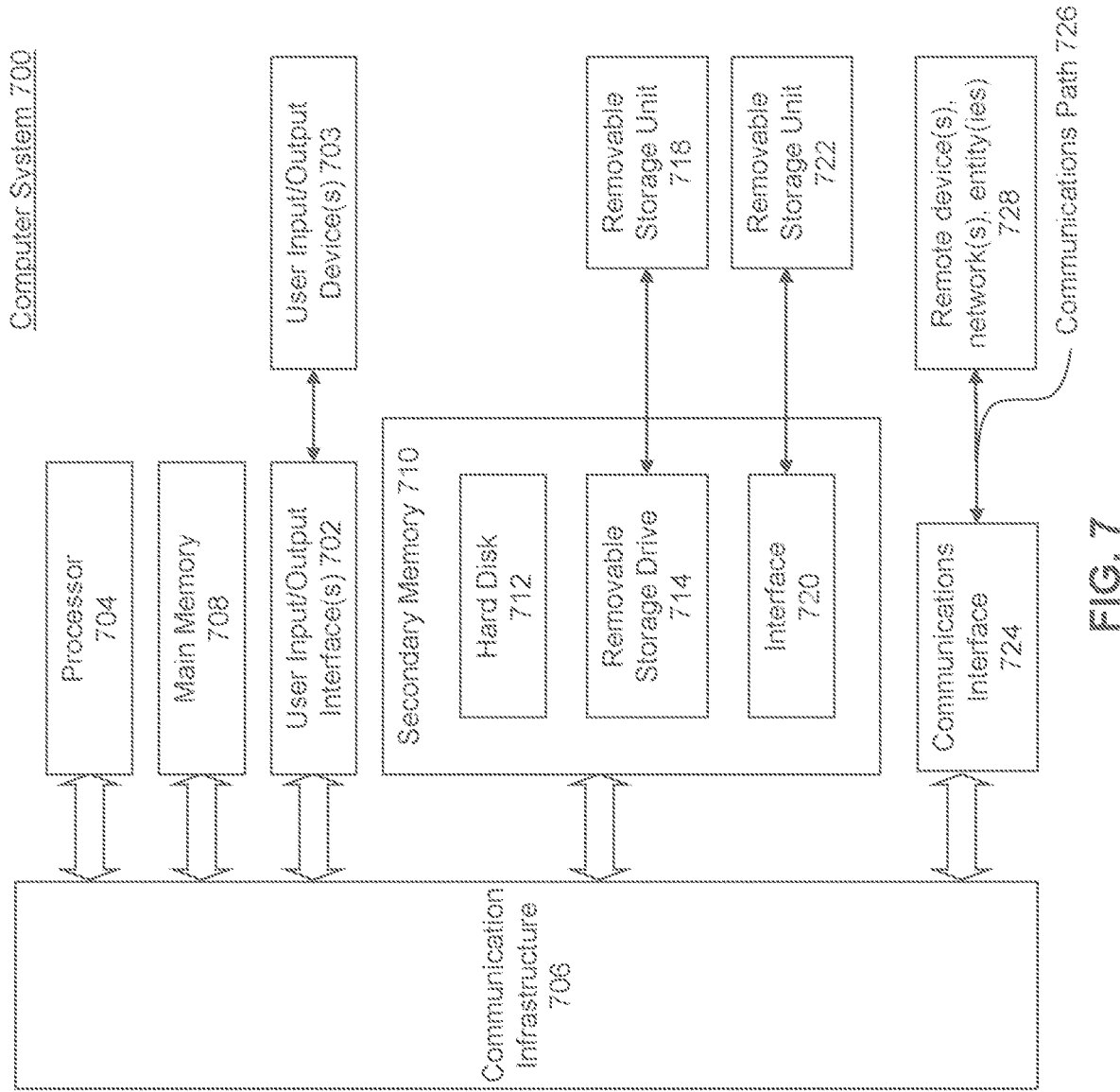
FIG. 7 illustrates a block diagram of an exemplary computer system for implementing one or more aspects of the disclosed embodiments according to various embodiments.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include customer input/output device(s) 703, such as monitors, keyboards, pointing devices, etc., which may communicate with communication infrastructure 706 through customer input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random-access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings included in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A system for a declarative authentication engine, comprising:

a memory; and at least one processor coupled to the memory and configured to:

generate, in response to selection of a base authentication protocol, a schema that includes a field and an optional field and has a format defined by the base authentication protocol associated with a service;

validate a connection request based on comparing the field of the generated schema to a field of the connection request for the service, wherein the connection request is formatted according to the schema and received from a client device; and provide the client device access to the service according to the connection request based on a result of the validating and in response to determining that the connection request fails to include the optional field.

2. The system of claim 1, wherein the generated schema field comprises a script and the connection request field comprises a value produced by the script executing.

3. The system of claim 1, wherein the schema is a default schema and the field comprises a username and password.

4. The system of claim 1, wherein the at least one processor is further configured to:

compare a version value of the generated schema to a version value of the connection request;

in response to the comparison, determine that the version value of the generated schema is compatible with the version value of the connection request; and in response to the determination, provide access to the service associated with the connection request.

5. The system of claim 1, wherein the field comprises a key and a value, and the at least one processor is further configured to:

generate a first graphical user interface (GUI) in response to the connection request, wherein the first GUI comprises the key; and in response, generate a second GUI corresponding to the service, wherein the second GUI is customized according to the value of the connection request field.

6. The system of claim 1, wherein the processor is further configured to:

store the connection request at a connection store;

receive a second connection request;

identify, at the connection store, the connection request based on a comparison between the connection request field and a second connection request field; and in response to the identification, provide access to the service according to the second connection request.

7. A method for using a declarative authentication engine, comprising:

generating, in response to selection of a base authentication protocol, a schema that includes a field and an optional field and has a format defined by the base authentication protocol associated with a service;

validating a connection request based on comparing the field of the generated schema to a field of the connection request for the service, wherein the connection request is formatted according to the schema and received from a client device; and provide the client device access to the service according to the connection request based on a result of the validating and in response to determining that the connection request fails to include the optional field.

8. The method of claim 7, wherein the generated schema field comprises a script and the connection request field comprises a value produced by the script executing.

9. The method of claim 7, the schema is a default schema and the field comprises a username and password.

10. The method of claim 7, wherein the method further comprises:

comparing a version value of the generated schema to a version value of the connection request;

in response to the comparing, determining that the version value of the generated schema is compatible with the version value of the connection request; and in response to the determining, providing access to the service associated with the connection request.

11. The method of claim 7, wherein the field comprises a key and a value and the method further comprises:

generating a first graphical user interface (GUI) in response to the connection request, wherein the first GUI comprises the key; and generating a second GUI corresponding to the service, wherein the second GUI is customized according to the value of the connection request field.

12. The method of claim 7, wherein the method further comprises:

storing the connection request at a connection store;

receiving a second connection request;

identifying, at the connection store, the connection request based on a comparison between the connection request field and a second connection request field; and in response to the identification, provide access to the service according to the second connection request.

13. A non-transitory computer-readable device having instructions stored thereon that, when executed by at least one computing device, cause the at least one computing device to perform operations comprising:

generating, in response to selection of a base authentication protocol, a schema that includes a field and an optional field and has a format defined by the base authentication protocol associated with a service;

validating a connection request based on comparing the field of the generated schema to a field of the connection request for the service, wherein the connection request is formatted according to the schema and received from a client device; and providing the client device access to the service according to the connection request based on a result of the validating and in response to determining that the connection request fails to include the optional field.

14. The non-transitory computer-readable device of claim 13, wherein the generated schema field comprises a script and the connection request field comprises a value produced by the script executing.

15. The non-transitory computer-readable device of claim 13, wherein the schema is a default schema and the field comprises a username and password.

16. The non-transitory computer-readable device of claim 13, wherein the operations further comprise:

comparing a version value of the generated schema to a version value of the connection request;

in response to the comparing, determining that the version value of the generated schema is compatible with the version value of the connection request; and in response to the determining, providing access to the service associated with the connection request.

17. The non-transitory computer-readable device of claim 13, wherein the operations further comprise:

generating a first graphical user interface (GUI) in response to the connection request, wherein the first GUI comprises a key; and in response, generating a second GUI corresponding to the service, wherein the second GUI is customized according to the value of the connection request field.

18. The non-transitory computer-readable device of claim 13, wherein the operations further comprise:

storing the connection request at a connection store;

receiving a second connection request;

identifying, at the connection store, the connection request based on a comparison between the connection request field and a second connection request field; and in response to the identification, providing access to the service according to the second connection request.

\* \* \* \* \*